United States Patent [19]
Gagnon

[11] Patent Number: 5,307,514
[45] Date of Patent: Apr. 26, 1994

[54] FREQUENCY INDEPENDENT STRONG SIGNAL SUPPRESSOR

[75] Inventor: André Gagnon, Hull, Canada

[73] Assignee: Telemus Electronic Systems Inc., Ottawa, Canada

[21] Appl. No.: 753,353

[22] Filed: Aug. 30, 1991

[51] Int. Cl.$^5$ ................................................ G01S 7/36
[52] U.S. Cl. ..................................... 455/281; 342/17; 455/296
[58] Field of Search ................. 342/17, 19; 455/226.1, 455/226.3, 80, 81, 271, 278.1, 280–287, 296, 289, 206, 210, 1, 19; 333/17.1, 17.2

[56] References Cited

U.S. PATENT DOCUMENTS 4,406,016  9/1983  Abrams et al. ..................... 455/19
4,965,581 10/1990  Skudera, Jr. et al. ................ 342/19

Primary Examiner—Reinhard J. Eisenzopf
Assistant Examiner—Chi H. Pham
Attorney, Agent, or Firm—Antonelli, Terry, Stout & Kraus

[57] ABSTRACT

A frequency independent strong signal suppressor comprised of an amplitude dependent voltage standing wave ratio device for receiving and substantially absorbing incident radio frequency signals characterized by amplitudes greater than a predetermined threshold and substantially reflecting signals characterized by amplitudes less than the threshold, such that strong signals are absorbed and thereby suppressed while weak signals are reflected for reception by an external signal processing device.

20 Claims, 1 Drawing Sheet

FREQUENCY INDEPENDENT STRONG SIGNAL SUPPRESSOR

FIELD OF THE INVENTION

This invention relates in general to radio frequency (RF) signal processing, and more particularly to a device for suppressing a strong RF jamming signal in order to extract a relatively weak information signal transmitted simultaneously with the jamming signal, independently of any frequency separation between the strong and weak signals.

BACKGROUND OF THE INVENTION

Various types of radio frequency signal processing devices, such as Instantaneous Frequency Measurement (IFM) receivers or Digital Frequency Discriminators (DFDs), have been developed to detect specific RF signals in dense signal environments characteristic of electronic warfare. It is well known from the field of Electronic Counter Measures (ECM) to transmit a relatively weak information signal, (e.g. Radar) in the presence of a strong jamming signal having the same frequency as the information signal. Thus, ECM systems are designed to render extraction of the information signals extremely difficult, without knowing the jamming signal frequency.

Electronic Support Measurement (ESM) devices have been developed for extracting such relatively weak information signals in the presence of a strong jamming signal. One prior art approach consists of using a band-stop (or notch) filter for separating the information and jamming signals on the basis of small frequency differences therebetween. The band-stop filter is tuned to the frequency of the strong jamming signal, thereby attenuating it and allowing extraction of the information signal.

Obviously, this prior art approach requires a predetermined minimal amount of frequency separation between the jamming and information signals in order to attenuate the former without attenuating the latter. Thus, the previous approach suffers from two main disadvantages. Firstly, attenuation of the strong jamming signal is frequency dependent, such that in the event the frequency separation between the jamming and information signals is not sufficiently large with respect to the filter bandwidth, the information signal will suffer a certain amount of attenuation. Therefore, in the event the information and jamming signal frequencies are identical, the prior art approach cannot be used. Secondly, in the event the frequency of the strong jamming signal is unknown, the ESM device must first measure the jamming frequency and then tune the filter. Most ECM systems transmit jamming and information signals at a continuously variable frequency, according to a pseudorandom pattern, making frequency detection prior to filter tuning extremely difficult.

SUMMARY OF THE INVENTION

According to the present invention, a frequency independent strong signal suppressor is provided for suppressing a strong jamming signal in order that an information signal may be extracted for additional signal processing. An amplitude dependent Voltage Standing Wave Ratio (VSWR) device is utilized for receiving an incident RF signal (e.g. a combined jamming and information signal), absorbing the jamming signal and reflecting the information signal for reception by an external signal processing device. Signals having amplitudes greater than a predetermined threshold (i.e. jamming signals) are absorbed while weaker signal (e.g. radar signals) are substantially reflected by the amplitude dependent VSWR device.

Hence, according to the present invention, information signals which are transmitted in the presence of strong jamming signals, may be extracted regardless of the relative frequencies of the information and jamming signals. The device of the present invention operates instantaneously on received signals, thereby overcoming the disadvantage of the prior art approach which typically required a predetermined amount of time in order to detect the jamming signal frequency and thereafter tune a notch filter to the detected frequency. The device of the present invention is of extremely simple design, and may be advantageously and inexpensively fabricated on a small hybrid circuit.

An important aspect of the amplitude dependent VSWR device is that the return loss is a function of the incident signal power. In particular, the input characteristics of the device exhibit a return loss which approaches infinity in the presence of an incident signal having power greater than a predetermined threshold (i.e. turn-on point), and a return loss which approaches O dB in the presence of an input signal having power less than the turn-on point threshold.

BRIEF DESCRIPTION OF THE DRAWING

A better understanding of the invention will be obtained with reference to the detailed description below in conjunction with the following drawings in which.

DESCRIPTION OF THE PREFERRED EMBODIMENT(S)

Figure 1:
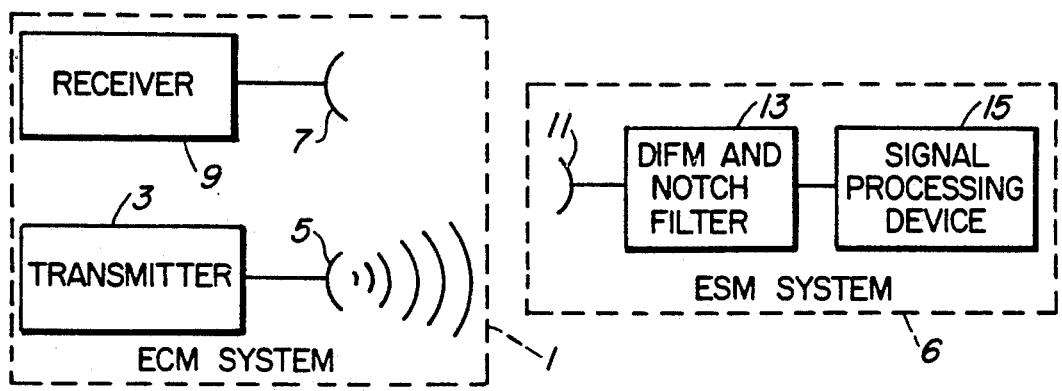
FIG. 1 is a block diagram of an electronic warfare scenario, according to the prior art.

With reference to FIG. 1, a typical electronic warfare scenario is illustrated, wherein an ECM system is shown generally as 1, and is comprised of a transmitter 3 for generating an information signal and a jamming signal at the same frequency, and an antenna 5 for transmitting the combined signals.

Signals are received within the ECM system via a further antenna 7 and applied to a receiver 9. The receiver 9 also typically incorporates a notch filter tuned for attenuating the known jamming signal frequency while substantially allowing the information signal to pass unattenuated, for additional signal processing.

A remote ESM system 6 is shown comprised of an antenna 11 connected to a circuit 13 for detecting the frequency of the jamming signal and thereafter tuning an internal notch filter to the desired frequency. For instance, a DIFM receiver may be used to isolate and detect the jamming signal frequency. The tuned notch filter then substantially attenuates the jamming signal while transmitting the information signal to an external signal processing device 15.

As discussed, prior art combined DIFM and notch filter circuits suffer from a number of disadvantages, such as the time required for detecting the jamming signal frequency, and inadvertent attenuation of the information signal in the event of only a small, or no frequency separation between the jamming and information signals.

Figure 2:
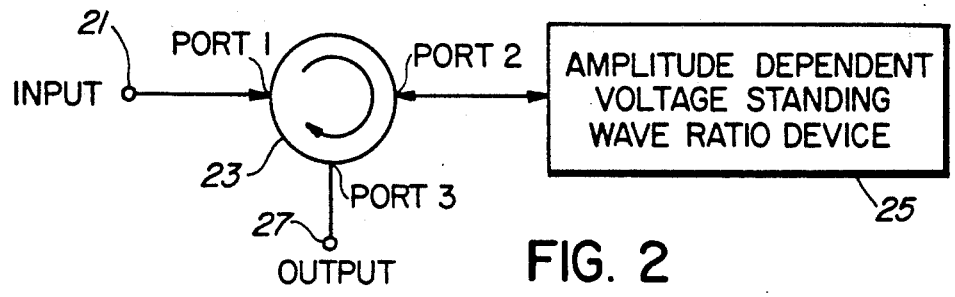
FIG. 2 is a block diagram of a frequency independent strong signal suppressor in accordance with the present invention.

FIG. 2 illustrates a frequency independent strong signal suppressor according to the present invention. Incident signals received by an antenna (such as antenna 7 or 11 with reference to FIG. 1), are applied to an input terminal 21 and transmitted therefrom to an input port (Port 1) of a hybrid circuit 23. Hybrid circuit 23 translates signals received on Port 1 to a second port (Port 2), for reception by an amplitude dependent Voltage Standing Wave Ratio (VSWR) device 25, discussed in greater detail below with reference to FIG. 3. Signals output from VSWR device 25 and applied to Port 2 are translated from Port 2 to be output from a third port (Port 3) of the hybrid circuit 23, for further application to an output terminal 27.

According to a preferred embodiment, hybrid circuit 23 is comprised of a microwave circulator, which is a component for acting on the magnetic field of an incident signal such that signals received on Port 1 are unidirectionally translated to Port 2, signals received on Port 2 are unidirectionally translated to Port 3, and signals received on Port 3 are unidirectionally translated to Port 1.

Figure 3:
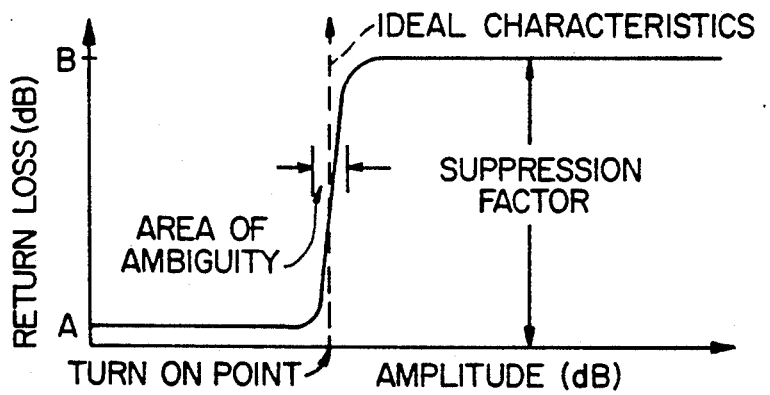
FIG. 3 is a graph illustrating return loss characteristics of an amplitude dependent VSWR device utilized in accordance with the present invention, and, FIG. 4 is a block diagram of a modified ECM system utilizing the strong signal suppressor, according to an alternative embodiment of the present invention.

With reference to the graph illustrated in FIG. 3, operation of the amplitude dependent VSWR device 25 (FIG. 2) is described in greater detail. The device is seen to be characterized by an abrupt change in return loss relative to the incident signal amplitude, (i.e. power). Thus, for incident signals having amplitudes less than a predetermined threshold (designated as the turn-on point), the device 25 is characterized by a return loss of A dB (which ideally approaches O dB). Conversely, for incident signals having amplitudes greater than the turn-on point threshold, the device 25 is characterized by a return loss of B dB (which ideally approaches infinity).

As can be seen from FIG. 3, the return loss characteristics of the amplitude dependent VSWR device 25 exhibit a steep increase in the return loss (vertical, on the ideal case) for signals having amplitude greater than the turn-on threshold. In the event of incident signals having amplitudes within the designated "area of ambiguity" on either side of the turn-on point threshold, the return loss is mid-way between substantial reflection (A dB) and substantial absorption (B dB). The variation in return loss for signals above and below the turn-on point threshold, is designated by the term "suppression factor".

In operation, combined radio frequency (e.g. microwave) information and jamming signals are received on input terminal 21 from an antenna (e.g. antenna 11 or 7 in FIG. 1). The received combined RF signals are applied to Port 1 and circulated to Port 2 and transmitted therefrom to the amplitude dependent VSWR device 25. Typically, the jamming signal is characterized by an amplitude greater than the turn-on point threshold of device 25 while the information signal is characterized by an amplitude significantly less than the turn-on point threshold. Thus, as can be seen with reference to FIG. 3, the VSWR device 25 exhibits a large return loss (e.g. B dB) with respect to the jamming signal, and a low return loss (e.g. A dB) with respect to the information signal. In other words, the device offers a substantially perfect match in impedance to the jamming signal and a substantially mismatched impedance to the information signal. Therefore, the jamming signal will be substantially absorbed by device 25 while the information signal will be substantially reflected.

The reflected information signal is applied to Port 2 of hybrid 23, circulated to Port 3, and transmitted therefrom to output terminal 27 connected to an external signal processing device (e.g. device 15 or 9 with reference to FIG. 1).

In the event both the incident jamming and information signals are characterized by amplitudes less than the turn-on point threshold of the device 25, the signals may be amplified prior to application to the input terminal 21 in FIG. 2. Also, a plurality of signal suppressors can be cascaded in series, with signal amplifiers disposed between successive ones thereof.

Conversely, in the event both the jamming and information signals are characterized by amplitudes which exceed the turn-on point threshold, an attenuator may be connected to the input terminal 21 for sufficiently attenuating both signals in order that the jamming signal remains above the turn-on point threshold while the information signal is reduced to less than this threshold.

The device according to the present invention absorbs or reflects RF signals only on the basis of amplitude, independent of frequency. Thus, a relatively weak information signal can be extracted even in the presence of a strong jamming signal of the same frequency.

The amplitude dependent VSWR device 25 is preferably one of a variety of non-linear radio frequency devices, such as detectors, limiters, frequency doublers or dividers, etc. However, if the difference in amplitude between a pair of incident jamming and information signals is less than the area of ambiguity characteristic of the device, the device will not function properly. Accordingly, in order to minimize the area of ambiguity (to preferably less than 20–30 dB), a device having an abrupt change in return loss is preferred, (i.e. as shown in FIG. 3).

According to the preferred embodiment, amplitude dependent VSWR device 25 was comprised of an anolog microwave frequency divider manufactured by Telemus Electronic Systems Inc., and sold under the trademark Halver TM. The Telemus frequency Halver TM circuit is described in greater detail in Canadian Pat. No. 1,041,614 entitled "BROAD BAND FREQUENCY DIVIDER USING MICROWAVE VARACTORS", as well as in the following issued Canadian Patents: Nos. 1,085,925 entitled "APPARATUS FOR MEASURING THE FREQUENCY OF MICROWAVE SIGNALS"; 1,111,114 entitled "MICROWAVE DIVISION BY PHASE LOCK LOOPS"; 1,124,337 entitled "MICROWAVE PHASE LOCK LOOPS USING FET FREQUENCY DIVIDERS"; 1,105,574 entitled "BROAD BAND MICROWAVE FREQUENCY DIVIDER FOR DIVISION BY A NUMBER GREATER THAN 2"; 1,118,849 entitled "WIDE BAND MESFET MICROWAVE FREQUENCY DIVIDER"; 1,121,006 entitled "BROAD BAND FREQUENCY DIVIDER" and 1,119,702 entitled "PARAMETRIC FREQUENCY DIVISION".

While the present invention may be advantageously utilized within ESM systems, an alternative application of the invention is directed to ECM systems. Prior art ECM systems, such as shown in FIG. 1, have utilized separate transmit and receive antennas 5 and 7. This is a result of the requirement that a sufficient degree of isolation (e.g. typically 120 dB) must be maintained between the transmitter 3 and receiver 9 in order to allow the jamming signal to disperse and thereby become attenuated in order to receive the information signal without requiring use of a notch filter.

The requirement of separate transmit and receive antennas has been found to be a significant disadvantage in terms of cost and complexity. Furthermore, in certain environments, such as on ships, it is usually quite difficult to accommodate two separate antennas with the requisite amount of separation.

Figure 4:
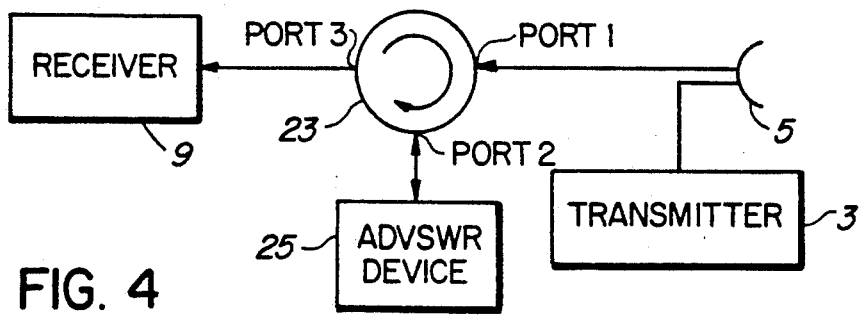

According to the alternative application of the present invention, an ECM system is provided with reference to FIG. 4, comprised of a transmitter 3 connected to an antenna 5, a hybrid 23 (e.g. circulator) connected through Port 1 to the antenna 5, an amplitude dependent VSWR device 25 connected to Port 2, and a receiver 9 connected to Port 3 of the hybrid 23.

In operation, the strong signal suppressor comprised of hybrid 23 and VSWR device 25 extracts an information signal received from antenna 5, even in the presence of a strong jamming signal, such that no isolation is required between the transmitter 3 and receiver 9. Hence, only a single antenna 5 is required for both transmission and reception, resulting in considerable savings in cost and complexity of the ECM system.

In summary, the strong signal suppressor according to the present invention provides virtually instantaneous extraction of a weak information signal in the presence of strong jamming signal independently of signal frequency and without requiring expensive, complex and slow IFM and notch filter circuitry as in the prior art.

A person understanding the present invention may conceive of other embodiments or variations therein. For example, as discussed above, hybrid 23 is preferably a microwave circulator. However, other appropriate hybrid circuits, such as directional couplers, etc., may be utilized. Also, while the amplitude dependent VSWR device 25 was comprised of a frequency Halver TM circuit in the preferred embodiment, most non-linear radio frequency devices such as detectors, limiters, frequency doublers, type-C amplifiers, or frequency dividers may be utilized. However, the device 25 must be characterized by a relatively sharp or abrupt turn-on characteristic resulting in a small area of ambiguity, and must also present a perfect match (high return loss) only for signals having amplitudes greater than the turn-on point threshold.

All such embodiments or variations are considered to be within the sphere and scope of the present invention as defined by the claims appended hereto.

The embodiments of the invention in which an exclusive property or privilege is claimed are defined as follows:

1. A frequency independent strong signal suppressor, comprised of an amplitude dependent voltage standing wave ratio device for receiving and substantially absorbing incident radio frequency signals characterized by amplitudes greater than a predetermined threshold and substantially reflecting signals characterized by amplitudes less than said threshold, and means for extracting said reflected signals for processing by an external signal processing device, such that strong signals are absorbed and thereby suppressed while weak signals are reflected and extracted for processing by said signal processing device.

2. A frequency independent strong signal suppressor as defined in claim 1, wherein said device is comprised of a non-linear microwave device.

3. A frequency independent strong signal suppressor as defined in claim 1 or 2 wherein said device is comprised of an analog frequency divider.

4. A frequency independent strong signal suppressor as defined in claim 1 or 2 wherein said device is comprised of a broad band frequency divider using microwave varactors.

5. A frequency independent strong signal suppressor as defined in claim 1 or 2 wherein said device is comprised of a balanced microwave broad band frequency Halver TM circuit.

6. A frequency independent strong signal suppressor as defined in claim 1 or 2 wherein said device is comprised of one of either a reactive or resistive non-linear microwave device.

7. A frequency independent strong signal suppressor as defined in claim 1 or 2 wherein said device is comprised of one of either a microwave detector, limiter, frequency doubler or Type-C amplifier.

8. A frequency independent strong signal suppressor comprised of:
   (a) a hybrid having at least three ports, a first one of said ports being adapted to receive and couple signals to a second one of said ports, said second one of said ports being adapted to receive and couple signals to a third one of said ports,
   (b) an input terminal for receiving and applying radio frequency signals to said first port, such that said signals are coupled to said second port,
   (c) means connected to said second port, for receiving and substantially absorbing predetermined ones of said radio frequency signals having amplitudes greater than a predetermined threshold while substantially reflecting to said second port further predetermined ones of said radio frequency signals having amplitudes less than said predetermined threshold, such that said reflected signals are coupled to said third port, and
   (d) an output terminal connected to said third port, for transmitting said reflected signals, whereby strong radio frequency signals having amplitudes greater than said threshold are absorbed and thereby suppressed while relatively weak signals having amplitudes less than said threshold are reflected and transmitted to said output terminal.

9. A frequency independent strong signal suppressor as defined in claim 8, wherein said means is comprised of a non-linear radio frequency device.

10. A frequency independent strong signal suppressor as defined in claim 9, wherein operation of said radio frequency device is characterized by an abrupt variation in return loss for incident signals having amplitudes in the vicinity of said threshold.

11. A frequency independent strong signal suppressor as defined in claim 8, 9 or 10, wherein said means is characterized by an amplitude dependent voltage standing wave ratio.

12. A frequency independent strong signal suppressor as defined in claim 8, 9 or 10, wherein said means is comprised of an analog frequency divider.

13. A frequency independent strong signal suppressor as defined in claim 8, 9 or 10, wherein said means is comprised of a broad band frequency divider using microwave varactors.

14. A frequency independent strong signal suppressor as defined in claim 8, 9 or 10, wherein said means is comprised of a balanced microwave broad band frequency Halver TM circuit.

15. A frequency independent strong signal suppressor as defined in claim 8, 9 or 10, wherein said means is comprised of one of either a reactive or resistive nonlinear microwave device.

16. A frequency independent strong signal suppressor as defined in claim 8, 9 or 10, wherein said means is comprised of one of either a microwave detector, microwave limiter, microwave frequency doubler, or Type-C amplifier.

17. A frequency independent strong signal suppressor comprised of:
(a) a hybrid for receiving signals on respective ports thereof and unidirectionally coupling said received signals to respective adjacent ports thereof, said hybrid being adapted to receive signals on a first one of said ports and couple said received signals to a second adjacent one of said ports,
(b) an amplitude dependent VSWR device connected to said second one of said ports for receiving and substantially absorbing predetermined ones of said signals having amplitudes greater than a predetermined threshold and substantially reflecting further predetermined ones of said signals having amplitudes less than said threshold, and
(c) said hybrid being adapted to receive said reflected signals on said second one of said ports and couple said reflected signals to a third one of said ports, whereby strong signals are substantially absorbed and thereby suppressed while weaker signals are substantially reflected and coupled to said third port.

18. A frequency independent strong signal suppressor as defined in claim 17 wherein said predetermined signals are radio frequency jamming signals and said further predetermined signals are radio frequency information signals.

19. A frequency independent strong signal suppressor as defined in claim 18, further comprised of:
(a) an antenna for receiving and applying said jamming and information radio frequency signals to an input terminal coupled to said hybrid,
(b) a transmitter connected to said antenna for generating and transmitting outbound combined jamming and information radio frequency signals, and
(c) a receiver connected to said output terminal, for receiving and processing said reflected information signals,
whereby said antenna is utilized for both reception and transmission of said radio frequency signals, thereby forming an electronic counter measures system.

20. A method for frequency independent suppression of strong signals, comprising the steps of:
(a) receiving a combined radio frequency signal comprising a strong jamming signal and a relatively weak information signal,
(b) applying said combined radio frequency signal to an amplitude dependent voltage standing wave ratio device, whereupon said strong jamming signal is substantially absorbed and said relatively weak information signal is substantially reflected, and
(c) receiving and outputting said reflected information signal.

* * * * *